US010816089B2

(12) United States Patent
Figura et al.

(10) Patent No.: US 10,816,089 B2
(45) Date of Patent: Oct. 27, 2020

(54) GEAR UNIT FOR MOTOR VEHICLE

(71) Applicant: Ford Global Technologies, LLC, Dearborn, MI (US)

(72) Inventors: Michael Georg Figura, Dormagen (DE); Alexander Ein Waldt, Cologne (DE); Armin Schymczyk, Solingen (DE); Gerhard Friederich, Bornheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/636,202

(22) Filed: Jun. 28, 2017

(65) Prior Publication Data

US 2018/0003292 A1 Jan. 4, 2018

(30) Foreign Application Priority Data

Jun. 29, 2016 (DE) .................. 10 2016 211 694

(51) Int. Cl.
*F16H 57/12* (2006.01)
*B62D 5/04* (2006.01)
(Continued)

(52) U.S. Cl.
CPC .............. *F16H 57/12* (2013.01); *B62D 5/04* (2013.01); *B62D 5/0454* (2013.01); *F16C 35/045* (2013.01); *F16C 35/07* (2013.01); *F16C 35/077* (2013.01); *F16H 1/16* (2013.01); *F16H 55/24* (2013.01); *F16H 57/021* (2013.01);
(Continued)

(58) Field of Classification Search
CPC . B62D 5/0454; F16H 1/16; F16H 2057/0213; F16H 2057/0222; F16H 2057/0224; F16H 2057/127; F16H 55/24; F16H 57/021; F16H 57/022; F16H 57/039; F16H 57/12; F16C 35/042; F16C 35/06;
(Continued)

(56) References Cited

U.S. PATENT DOCUMENTS 5,439,299 A * 8/1995 Havens ................. F16C 35/067
384/537
6,725,964 B2 4/2004 Appleyard
(Continued)

FOREIGN PATENT DOCUMENTS

JP 201419237 A 2/2014

*Primary Examiner* — Joseph Brown
(74) *Attorney, Agent, or Firm* — Raymond L. Coppiellie; Burgess Law Office, PLLC

(57) ABSTRACT

A gear unit for a motor vehicle including a rotatable worm gear shaft rotating about a rotation axis and cooperating with a worm gear wheel in an engagement region spaced from the rotation axis. A pivotable rotary bearing mounts the worm gear shaft on a housing on one side of the engagement region and a loose rotary bearing, pretensioned in the direction of the spacing axis, mounts the other side in the housing. A support device supports the pivotable rotary bearing on the housing in the direction of the rotation axis. To optimize engagement between a worm gear shaft and a worm gear wheel, the pivotable rotary bearing pivots relative to the housing about a pivot axis perpendicular to the rotation axis and to the spacing axis. A support point of the support device is offset relative to the rotation axis along the spacing axis towards the engagement region.

5 Claims, 6 Drawing Sheets

(51) Int. Cl.
*F16H 57/039* (2012.01)
*F16H 55/24* (2006.01)
*F16H 57/022* (2012.01)
*F16C 35/04* (2006.01)
*F16C 35/07* (2006.01)
*F16C 35/077* (2006.01)
*F16H 1/16* (2006.01)
*F16H 57/021* (2012.01)

(52) U.S. Cl.
CPC ......... *F16H 57/022* (2013.01); *F16H 57/039* (2013.01); *F16H 2057/0213* (2013.01); *F16H 2057/0222* (2013.01); *F16H 2057/0224* (2013.01); *F16H 2057/127* (2013.01)

(58) Field of Classification Search
CPC ...... F16C 35/067; F16C 35/07; F16C 35/077; F16C 35/045
USPC .................. 74/388 PS, 425, 500, 724, 89.14
See application file for complete search history.

(56) References Cited

U.S. PATENT DOCUMENTS

| | | | |
|---|---|---|---|
| 7,077,235 B2* | 7/2006 | Eda | B62D 5/0409 180/444 |
| 7,201,075 B2 | 4/2007 | Tsutsui et al. | |
| 7,490,695 B2 | 2/2009 | Segawa | |
| 8,459,402 B2 | 6/2013 | Hamakita et al. | |
| 2003/0210841 A1* | 11/2003 | Linden | F16C 35/067 384/537 |
| 2007/0205039 A1* | 9/2007 | Imagaki | B62D 5/0409 180/444 |
| 2007/0223854 A1* | 9/2007 | Waseda | F01L 1/047 384/584 |
| 2009/0314114 A1* | 12/2009 | Grosberg | F16H 55/24 74/409 |
| 2012/0106883 A1* | 5/2012 | Griffin | F16C 23/10 384/441 |
| 2012/0272765 A1* | 11/2012 | Fuechsel | B62D 5/0409 74/416 |
| 2013/0025960 A1* | 1/2013 | Hama | B62D 5/0409 180/444 |
| 2013/0291671 A1* | 11/2013 | Boussaguet | F16H 57/12 74/409 |
| 2013/0294714 A1* | 11/2013 | Nakagawa | B62D 5/0409 384/220 |
| 2014/0008142 A1* | 1/2014 | Yoshikawa | B62D 5/0409 180/444 |
| 2016/0031473 A1 | 2/2016 | Riepold | |
| 2016/0097424 A1* | 4/2016 | Hafermalz | F16H 57/039 74/425 |
| 2016/0101808 A1* | 4/2016 | Tomizawa | F16H 55/24 180/444 |
| 2017/0050667 A1* | 2/2017 | Strobel | B62D 5/0409 |
| 2017/0096162 A1* | 4/2017 | Fuechsel | B62D 5/0409 |
| 2017/0184154 A1* | 6/2017 | Kawarada | F16C 35/077 |
| 2018/0058555 A1* | 3/2018 | Wilkes | B62D 5/0409 |
| 2018/0058556 A1* | 3/2018 | Appleyard | B62D 5/0409 |

* cited by examiner

GEAR UNIT FOR MOTOR VEHICLE

CROSS-REFERENCE TO RELATED APPLICATIONS

Not Applicable.

BACKGROUND OF THE INVENTION

1. Field of the Invention

The present invention relates generally to a gear unit for a motor vehicle; and more particularly to a gear unit having a worm gear shaft supported on a housing via a support device.

2. Description of Related Art

Modern motor vehicles are usually equipped with power-assisted steering to considerably reduce the effort to turn the steered wheels during driving and, when stopped or moving slowly. Power steering may also provide feedback of forces acting on the steered wheels and may generate a particular steering moment to point the driver to a recommended steering movement. Both hydraulic and motorized power steering systems are used. With a motorized power steering system, an electric servo motor with a drive shaft acts on a worm gear shaft, which acts on a worm gear wheel. The worm gear wheel sits on the actual steering shaft, which acts through a pinion on a steering rack. Similar systems having a servo motor, worm gear shaft, and worm gear wheel are also used in other areas of motor vehicles, for example, window lifters.

Although theoretically, under ideal conditions, an optimum engagement with the worm gear wheel is possible with a worm gear shaft rotating around a fixed axis, in practice engagement may deteriorate due to production-induced or installation-induced inaccuracies, wear effects, soiling, and environmental influences such as moisture and temperature. The above influences, alone or in combination, may lead to the engagement between the worm gear shaft and worm gear wheel being too loose and/or too tight. Too tight an engagement is also a problem since it leads to increased friction, makes the gears difficult to move, and increases wear.

One method known in the prior art for alleviating such problems is to mount the worm gear shaft, on a side facing the drive shaft, with a first roller bearing, normally a ball bearing, that allows tilt or pivot movement transversely to the axial direction of the worm gear shaft. A second roller bearing, normally a ball bearing, mounts the opposite side of the worm gear shaft to a gear housing or structure through a spring. The spring exerts a bias, applies a load, on the worm gear shaft, in the direction of the worm gear wheel. The worm gear shaft pivots about the first roller bearing to remain in approximately constant engagement with the worm gear wheel.

One disadvantage is that the pivotability is usually only possible through greater play in the region of the first roller bearing, leading to the possibility of vibrations and associated rattling noises, which are undesirable NVH aspects. The precision of the gear mechanism is also adversely affected because the axial and radial position of the worm gear shaft cannot be set precisely in the region of the first roller bearing. If bearing play is reduced in the region of the roller bearing, it usually leads to increased friction detracting from precision of control and leading to increased wear. Offsetting the action line of the force resulting from the engagement with the worm gear wheel on the worm gear shaft, towards the center axis of the latter, leads to a different level of friction and gear efficiency depending on the rotation direction of the worm gear shaft. This allows a degree of pivotability without the actual roller bearing needing unnecessary play, but the pivot axis is not defined precisely because of the structure of the pivot bearing. Also, the stiffness of the system against axial displacements is low and cannot be set in a targeted fashion. This in turn adversely affects the precision of the gear mechanism, and the engagement of the worm gear shaft with the worm gear wheel is not optimal. If engagement of the toothing under load is not optimal corresponding gear play leads to audible and undesirable clattering noise.

SUMMARY OF THE INVENTION

A gear unit for a motor vehicle including a worm gear wheel and a worm gear shaft rotatable about a rotation axis engaging the worm gear wheel in an engagement region spaced from the rotation axis along a spacing axis. The gear unit having a pivotable rotary bearing supporting the worm gear shaft on a housing on one side of the engagement region and a rotary bearing, pretensioned in the direction of the spacing axis, supporting an opposite side of the worm gear shaft on said housing. A support device supports the pivotable rotary bearing on the housing the direction of the rotation axis, wherein the pivotable rotary bearing pivots relative to the housing about a pivot axis perpendicular to the rotation axis and to the spacing axis. The support device including a support point offset relative to the rotation axis along the spacing axis towards the engagement region.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. In the different figures, identical parts are always provided with the same reference signs, and so said parts are generally also described only once.

Figure 1:
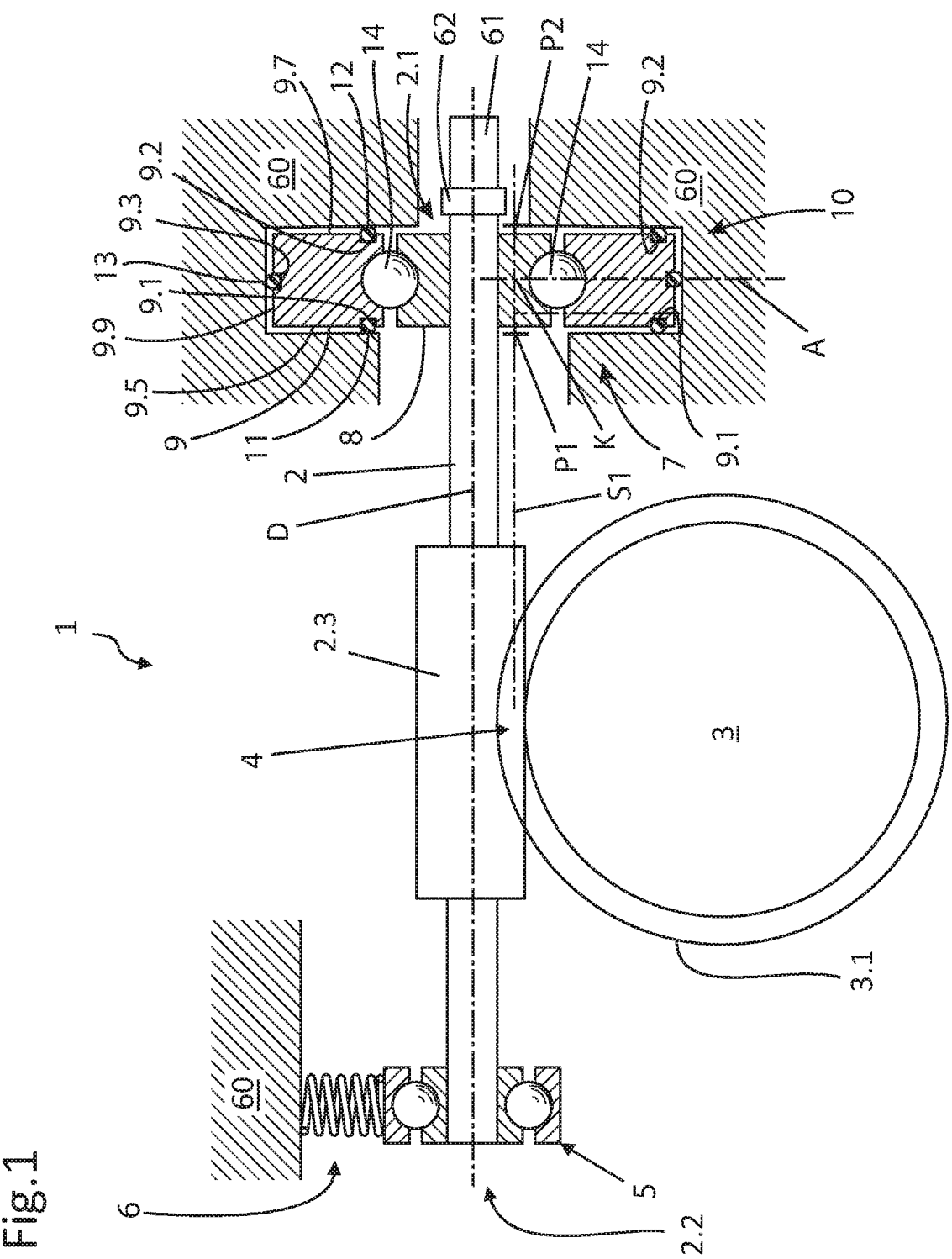
FIG. 1 is a diagrammatic, partial cross-sectional view depicting a first embodiment of a gear unit according to the invention.

FIG. 1 shows a simplified diagrammatic depiction of a first embodiment of a gear unit 1 according to the invention, used for example in a power steering system of a car.

The gear unit 1 includes a worm gear shaft 2 rotatably mounted about a rotation axis D, and a worm gear wheel 3, like the worm gear shaft 2, rotatably mounted relative to a housing 60. Although shown as one piece, the housing 60 may include several pieces rigidly connected together. A worm screw 2.3 of the worm gear shaft here cooperates with a gear ring 3.1 of the worm gear wheel 3 in an engagement region 4. The engagement region 4 spaced from the rotation axis D along a spacing axis A perpendicular to the rotation axis. A clutch 62, indicated diagrammatically, connects the worm gear shaft 3 at a first end 2.1 to a drive shaft 61 of a servo motor (not shown).

In the region of the first end 2.1, a first ball bearing 7 and a support device 10 mount the worm gear shaft 3 on the housing 60. The first ball bearing 7 including an inner bearing ring 8 and an outer bearing ring 9. The two bearing rings 8, 9 are configured substantially concentrically to the rotation axis D. The outer bearing ring 9 includes two peripheral grooves 9.1, 9.2 formed in the outer bearing ring 9 on opposite end faces 9.5, 9.7. As illustrated, the peripheral grooves 9.1, 9.2 are offset eccentrically to the rotation axis D in the direction of the spacing axis A, so their axis of symmetry S1 passes through the engagement region 4. For example, the peripheral grooves 9.1, 9.2 are located closer to the ball 14 above the rotation axis D than the peripheral grooves 9.1, 9.2 below the rotation axis D. A further groove 9.3 is formed on an outside surface or casing face 9.9 of the outer bearing ring 9. Rubber-elastic rings 11, 12, 13, part of the support device 10, are placed in all of the grooves 9.1, 9.2, 9.3. The rubber-elastic rings 11, 12, 13 provide support against axial forces. Support against the forces acting parallel to the rotation axis D is achieved almost exclusively by the eccentrically arranged rings 11, 12, leading to the support points P1, P2 lying on the axis of symmetry S and level with the engagement region 4 along the spacing axis A. Although the first ball bearing 7 is configured substantially without play, the worm gear shaft 2 with the ball bearing 7 may pivot, to a slight extent, about the indicated pivot axis K.

Because of the elastic mounting through the rubber-elastic rings 11, 12, 13, the first ball bearing 7 pivots relative to the housing 60 about a pivot axis K running perpendicular to the rotation axis D and to the spacing axis A. While pivot axis K is not defined it lies, approximately level with the axis of symmetry S1, and also level with the engagement region 4. The rings 11, 12 arranged on the end faces 9.5, 9.7 also influence the stiffness of the connection in the direction of the rotation axis D, while the ring 13 arranged on the outside or casing face 9.9 influences the stiffness of the connection transversely to the rotation axis D, in the radial direction.

At a second end 2.2, opposite the first end 2.1, the worm gear shaft 2 is mounted in a second ball bearing 5 connected to a housing 60 through a spring element 6, depicted diagrammatically. The spring element 6 pretensions the worm gear shaft 2 against the worm gear wheel 3. This, in connection with the pivotable mounting of the worm gear shaft 2, ensures an optimal engagement between the worm gear shaft 2 and the worm gear wheel 11.

During normal operation of the gear unit 1, the worm screw 2.3 cooperates with the gear ring 3.1, leading to a force component acting parallel to the rotation axis D and directed towards the first end 2.1 or the second end 2.2 depending on the direction of rotation, clockwise or counterclockwise. Since the engagement region 4 is offset relative to the rotation axis D in the direction of the spacing axis A, these forces lead to a torque relative to a pivot axis K intersecting the rotation axis D. Due to the eccentric arrangement of the rings 11, 12, the support points P1, P2 are level with the engagement region 4, therefore no such torque occurs in the present gear unit 1. The exemplary embodiment provides a gear efficiency independent of the direction of rotation, and an even wear on the respective sides of the worm screw 2.3 and gear ring 3.1.

Figure 2:
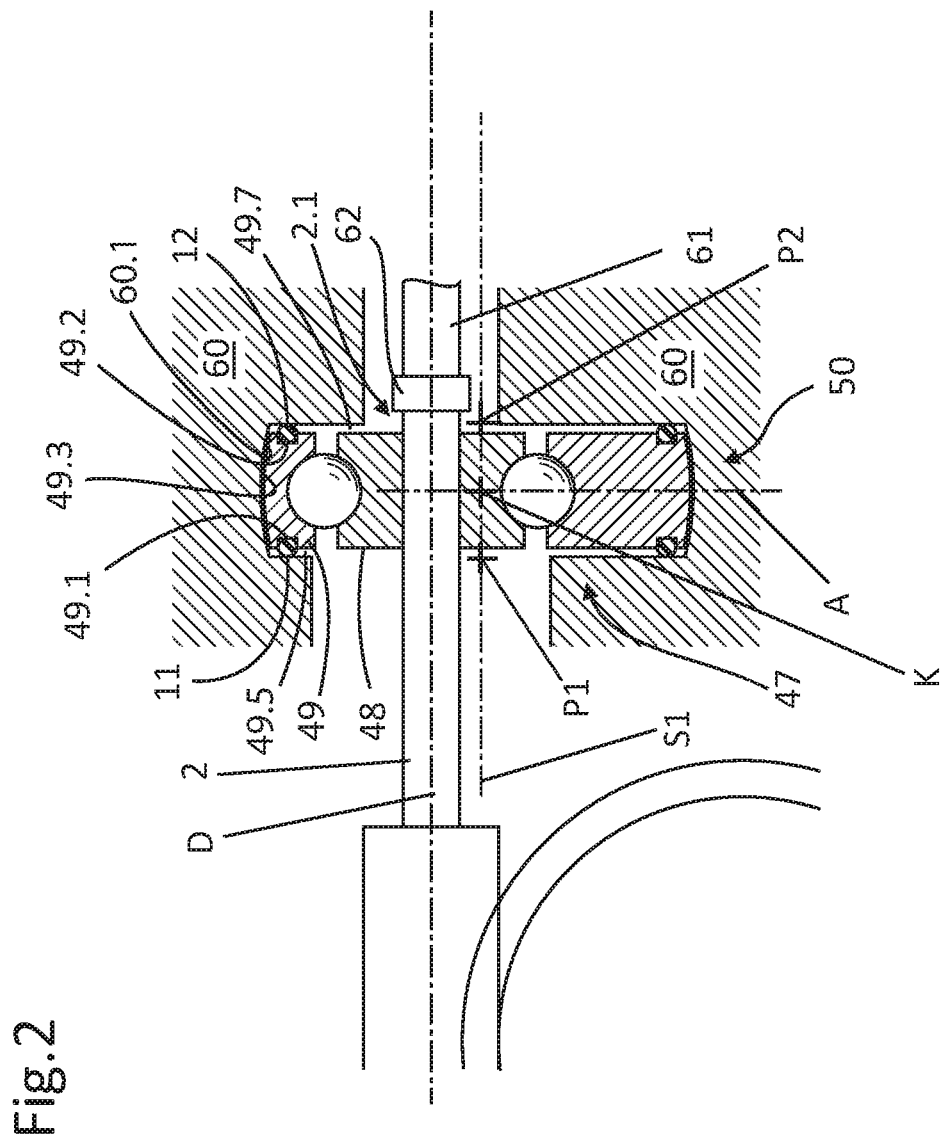
FIG. 2 is a diagrammatic, partial cross-sectional view depicting a second embodiment of a gear unit according to the invention.

FIG. 2 shows a second embodiment of a gear unit 1 according to the invention wherein a ball bearing 47 mounts the worm gear shaft 2 at the first end 2.1. The ball bearing 47 includes an inner bearing ring 48 symmetrical to the rotation axis D and an outer bearing ring 49, constructed on the inside rotationally symmetrically and coaxially to the rotation axis D. The outer bearing ring 49 has a spherical outer contour 49.3 offset thereto. This is rotationally symmetrical to the axis of symmetry S2 which runs through the engagement region 4. The outer bearing ring 49 has two grooves 49.1, 49.2 on the end face 49.5, 49.7 in which rubber-elastic rings 11, 12 are arranged and which are rotationally symmetrical to the axis of symmetry S2. Again, support points P1, P2 are as shown in FIG. 1. The convex, spherical outer contour 49.3 is received in a concave, spherical inner contour 60.1 of the housing 60.

Figure 3:
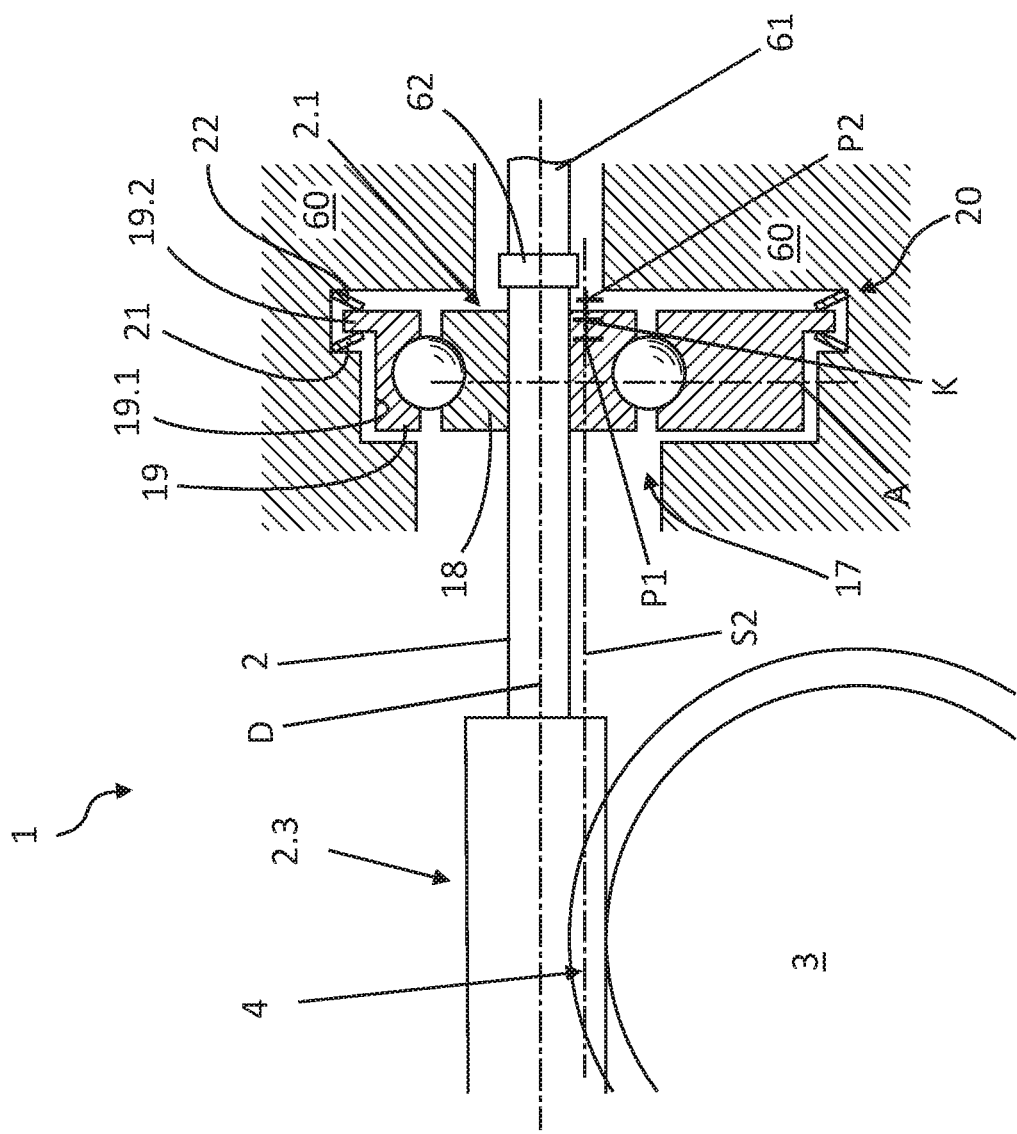
FIG. 3 is a diagrammatic, partial cross-sectional view depicting a third embodiment of a gear unit according to the invention.

FIG. 3 shows a third embodiment of a gear unit 1, again a ball bearing 17 mounts the worm gear shaft 2 at the first end 2.1. The ball bearing 17 includes an inner bearing ring 18 symmetrical to the rotation axis D and an outer bearing ring 19, constructed on the inside rotationally symmetrically and coaxially to the rotation axis D. The outer bearing ring 19 having a spherical outer contour 19.1 offset thereto and rotationally symmetrical to an axis of symmetry S2 running through the engagement region 4. The outer contour 19.1 includes a radially extending flange 19.2 formed thereon. The flange 19.2 supported on the housing 60 via a support device 20, in the disclosed embodiment two annular cup springs 21, 22. The cup springs 21, 22 arranged symmetrically to the axis of symmetry S2. Again, the support points P1, P2 lie level with the engagement region 4 along the spacing axis A. A pivot axis K is situated approximately between the support points P1, P2. The first ball bearing 17 pivotable about the pivot axis K relative to the housing 60. Instead of the cup springs 21, 22, Belleville or wave washers may also be used.

While the outer bearing ring 9, apart from the grooves 9.1, 9.2, 9.3, is formed rotationally symmetrically to the rotation axis D it would be possible to provide an eccentrically offset outer contour that runs concentrically to the grooves 9.1, 9.2.

Figure 5:
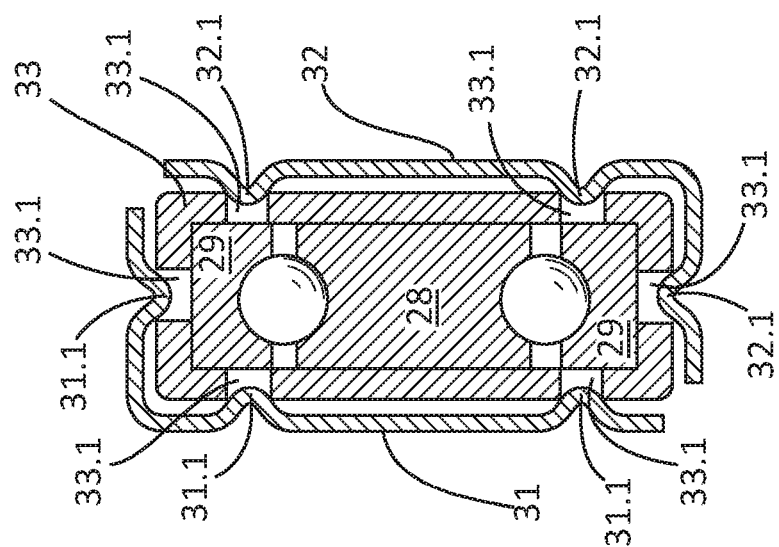
FIG. 5 is a cross-sectional view of the gear unit of FIG. 4 taken along line 5-5.
Figure 4:
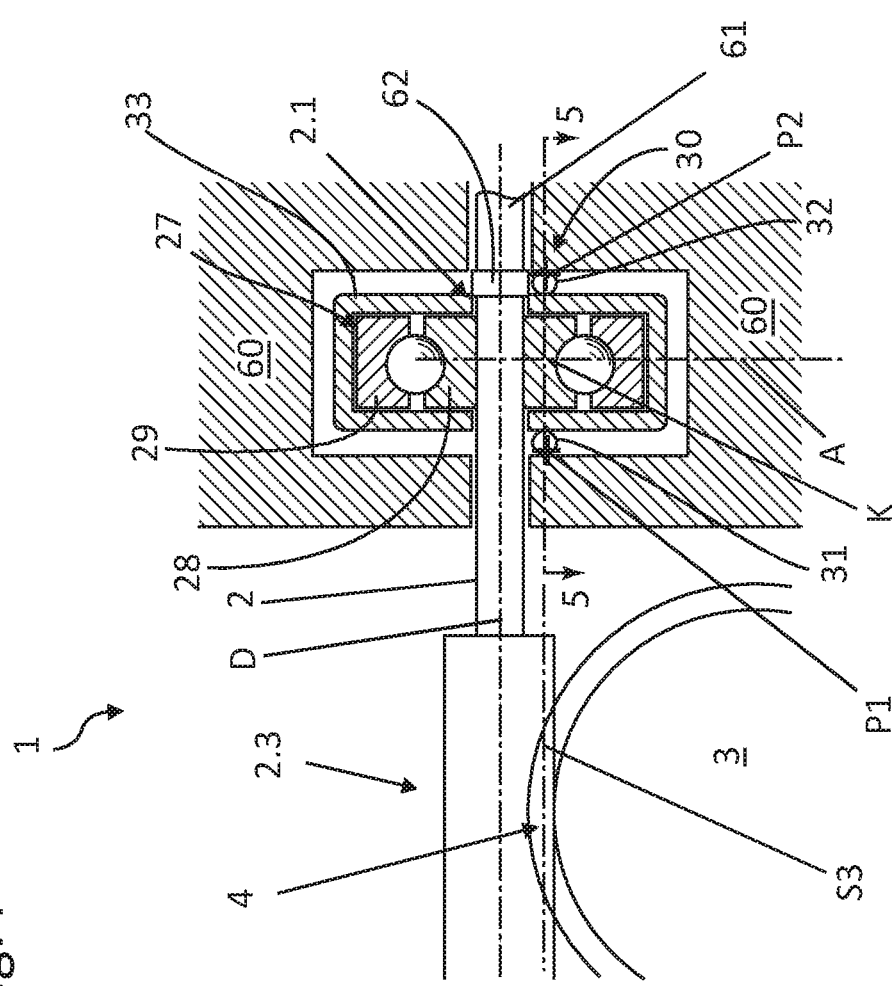
FIG. 4 is a diagrammatic, partial cross-sectional view depicting a fourth embodiment of a gear unit according to the invention.

FIGS. 4 and 5 show an additional embodiment a gear unit 1 according to the invention. As illustrated a first ball bearing 27 encased by a non-elastic encapsulation unit 33 is used to mount or support the worm gear shaft 2 on the housing 60. A support device 30 formed as a metal clip supports the encapsulation unit 33 on the housing 60. As shown in FIG. 5 the support device 30 is formed substantially from two wire pieces 31, 32 configured identically but rotated 180° relative to each other. Instead of a metal clip, this could be described as a clasp or similar. Each of the wire pieces 31, 32 has a series of inwardly directed protrusions 31.1, 32.1 engaged in recesses 33.1 of the encapsulation unit 33 creating an interference fit. FIG. 4 illustrates the support points P1, P2 lying in a plane of symmetry S3 of the support device 30 lying parallel to the rotation axis D and to a pivot axis K. As an alternative embodiment, the encapsulation unit 33 may be omitted and recesses may be provided inside the outer bearing ring 29, in which the wire pieces 31, 32 engage. Due to the elasticity of the metal clip pivotability is supported and impact loads can be absorbed.

Figure 6:
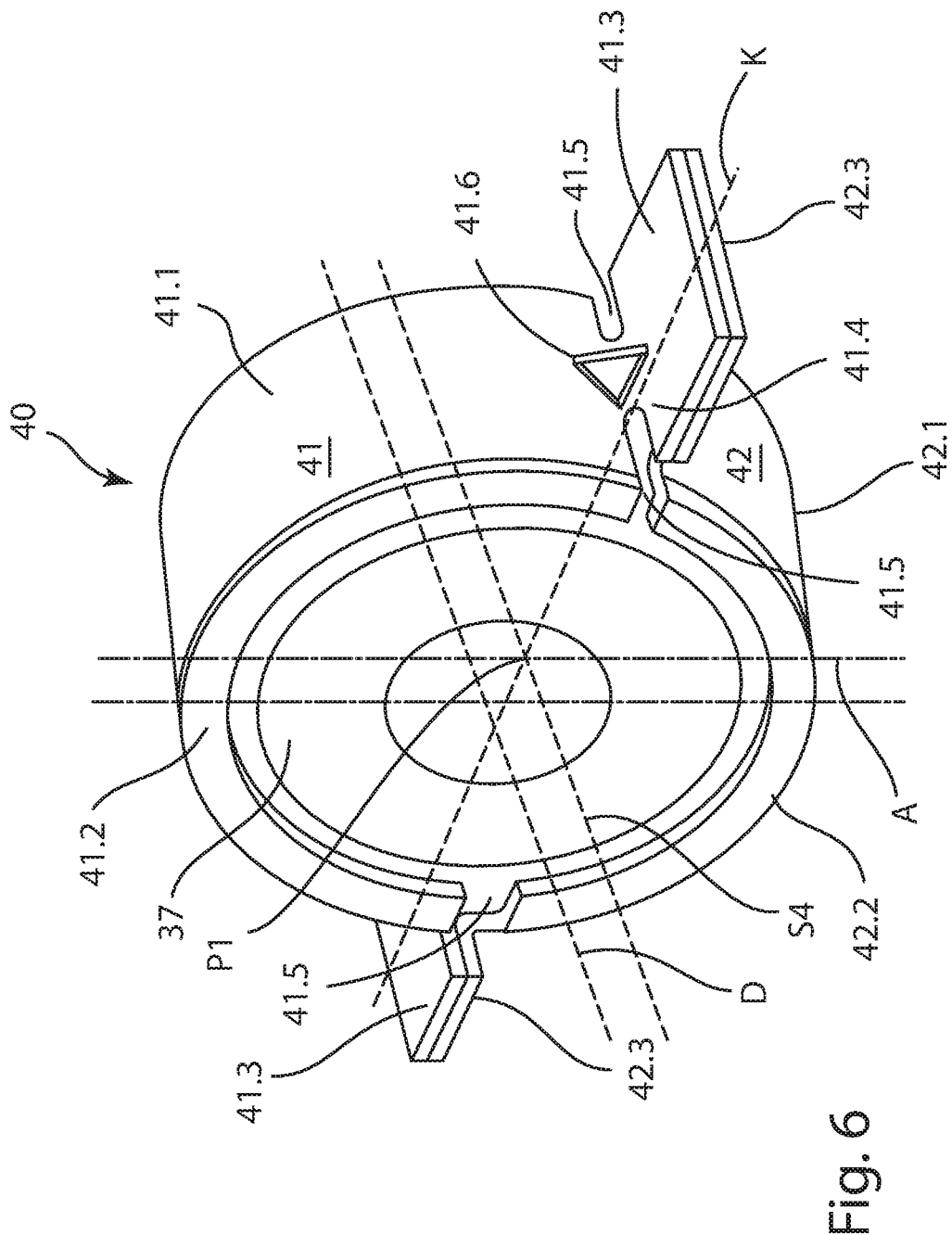
FIG. 6 is a partial perspective view of a fifth embodiment of a gear unit according to the invention.
Figure 7:
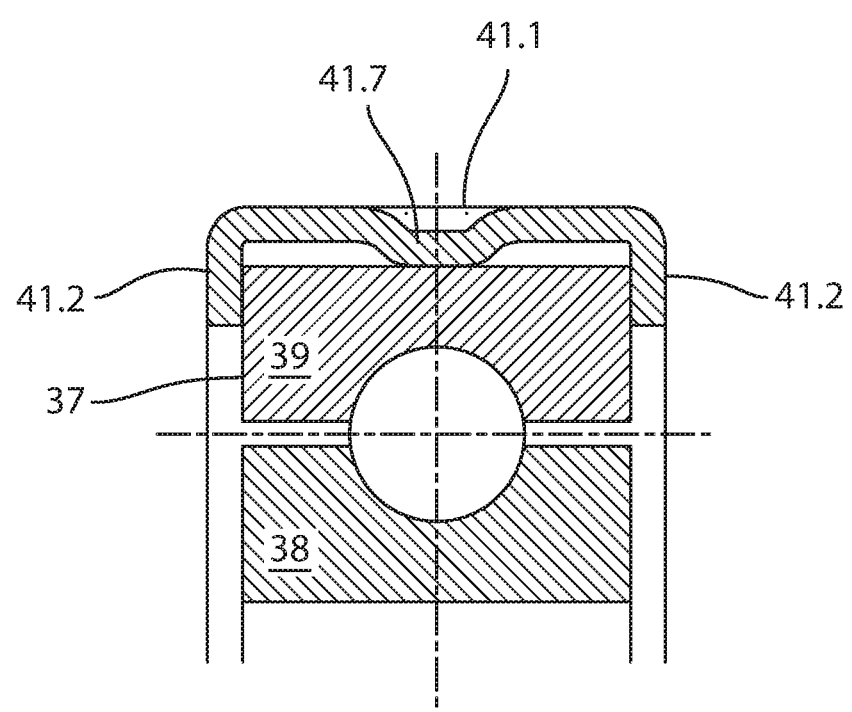
FIG. 7 is a partial, cross-sectional view depicting a portion of the gear unit of FIG. 6.

FIGS. 6 and 7 show a further embodiment of a gear unit according to the invention including a first ball bearing 37 having an inner bearing ring 38 and an outer bearing ring 39 formed rotationally symmetrically to the rotation axis D. The outer bearing ring 39 received, by form fit, in a support device 40 forming a holding arrangement having a first holding part 41 and a second holding part 42, each configured approximately in a semicircular-shape with outwardly extending flange portions or having a letter omega shape. The two holding parts 41, 42 are made of sheet metal. An approximately semicircular holding portion 41.1, 42.1 includes on the end faces there of flange portions 41.2, 42.2 for receiving the ball bearing 37 by form fit. The two holding parts abut each other in a region in which flat, adjoining connecting portions 41.3, 42.3 are formed. Connecting portions 41.3, 42.3 are offset relative to the rotation axis D along the spacing axis A and lie level with the engagement region 4. The connecting portions 41.3, 42.3 connecting or supporting the support device 40 on the housing side. A pivot axis K runs between the connecting portions 41.3, 42.3. The pivot axis K and an axis of symmetry S4 extending through the engagement region 4 parallel to the rotation axis D, form approximately the axes of symmetry of the parts of the support device 40 formed by the connecting portions 41.3, 42.3. The support point P1 is at the intersection of the pivot axis K with the axis of symmetry S4. To increase the elasticity regarding pivot movement about the pivot axis K, tapered portions 41.4, flanked by notches 41.5, are formed in the connecting region between the connecting portions 41.3, 42.3 and the holding portions 41.1, 41.2. To increase the stiffness against displacement in the direction of the spacing axis A, webs 41.6 are formed on the tapered portions 41.4. As illustrated in FIG. 7, the radial stiffness of the holding portions 41.1 can be increased if a radially inwardly extending bead 41.7 is formed.

The gear unit 1 may be used in a motor vehicle, in particular private cars and commercial vehicles. In one example, the gear unit 1 may be a gear unit for a power steering system, although other applications are possible, for example window lifters, electric seat adjustment mechanisms or other movable mechanisms.

The gear unit 1 has an axially extending, rotatably mounted worm gear shaft 2 rotatable about a rotation axis D. The worm gear shaft 2 cooperates with a worm gear wheel 3 in an engagement region 4 spaced from the rotation axis D along a spacing axis A. The worm gear shaft 2 is coupled, directly or indirectly, to a drive shaft 61 of a servo motor extending coaxially. A clutch arrangement 62 transmits torque from the drive shaft 61 to the worm gear shaft 2. The worm gear shaft 2 engages the worm gear wheel 3, whereby the rotary motion of the drive shaft 61 is stepped down. Because the worm gear shaft 2, in particular a worm screw 2.3 formed thereon, has a specific diameter, the engagement region 4, the region transmitting force from the worm gear shaft 2 to the worm gear wheel 3, is spaced from the rotation axis D transversely thereto. The direction of the spacing defines the spacing axis A. A center point of the worm gear wheel 3 is spaced from the rotation axis D along the spacing axis A. Normally, the spacing axis A runs perpendicularly to the rotation axis D.

A support device 10 supports a pivotable rotary bearing, seen generally at 7, and mounts one end 2.1 the worm gear shaft 2 on a housing 60, on one side of the engagement region 4. A second support device, including a loose rotary bearing, seen generally at 5, pretensioned in the direction of the spacing axis A, supports the opposite end 2.3 of the worm gear shaft 2 on the housing 16 in the direction of the rotation axis A. The housing 60 forming a reference frame, normally stationary relative to the vehicle, defining relative positions of the movable gear components. The housing 60 may be one piece or multipiece construction. It may be configured open to a varying extent, and could be described as a "frame" or similar. The gear components mentioned, and where applicable additional gear components, are largely surrounded by the housing 60. The worm gear shaft 2 rotates relative to the housing 60 on the pivotable rotary bearing 7 and the loose rotary bearing 5. The rotary bearings are normally roller bearings, in particular ball bearings. One of the rotary bearings could be configured as a plain bearing. The two rotary bearings 5, 7 are situated on either side of the engagement region 4, wherein the engagement region 4 is situated between the two rotary bearings 5, 7 along the worm gear shaft 2. Normally, the rotary bearings are situated at opposite ends 2.1, 2.2, or in the region of opposite ends 2.1, 2.2 of the worm gear shaft 2.

The worm gear shaft 2 mounted through a pivotable rotary bearing 7 supported on the housing 16 in the direction of the rotation axis D. The support device 10 disposed between the pivotable rotary bearing 7 and the housing 60 receives forces acting in the direction of the rotation axis D. Support in the direction of the rotation axis D refers to the direction of the forces acting during support, and does not mean that the support device 10 must be arranged between the pivotable rotary bearing 7 and the housing 60 in the direction of the rotation axis D. If the rotation axis D defines an axial direction, then the support device 10 can be said to receive at least axial forces. The support device 10 substantially defines the axial stiffness of the connection of the worm gear shaft 2 to the housing 60.

The opposite end 2.2 of the worm gear shaft 2 is mounted on the housing 60 using the loose rotary bearing 5. The loose rotary bearing 5 pretensioned in the direction of the spacing axis A, through an elastic pretension element, for example a spring 6, between the housing 60 and the loose rotary bearing 5. The spring may be made of metal or fiber-reinforced plastic, or an elastomeric element. The pretension of the rotary bearing 5 defines a pretension or inwardly biasing force of the worm gear shaft 2 in the direction towards the worm gear wheel 3. The pretension ensures the worm gear shaft 2 remains in engagement with the worm gear wheel 3, wherein a corresponding pretension element, because of its elastic property, may simultaneously allow a degree of deflection of the worm gear shaft 2, whereby the friction forces between the worm gear shaft 2 and the worm gear wheel 3 may be limited. The loose rotary bearing 5 may be configured as a loose bearing movable within a certain range, at least in the direction of the spacing axis A.

The pivotable rotary bearing 7 pivots relative to the housing 60 about a pivot axis K perpendicular to the rotation axis D and the spacing axis A. A support point P1, P2 of the support device 10 is offset relative to the rotation axis D along the spacing axis A towards the engagement region 4. Through pivot movement of the pivotable rotary bearing 7 the worm gear shaft 2 pivots relative to the housing 60. Instead of "pivot", the term "tilt" may also be used. The worm gear shaft 2 may pivot, if for example it follows a temporally and/or spatially uneven outer radius of the worm gear wheel 3, and under pretension by the pretension element. Because the pivotable rotary bearing 7 pivots relative to the housing 60, it is unnecessary to provide a ball bearing having a degree of or corresponding play enabling pivotability. In the exemplary embodiment, the rotary bearing 7 is designed without play, improving the precision of the gear mechanism 1 and eliminating a possible source of noise. The support device 10, and the configuration thereof, enables pivotability of the pivotable rotary bearing 7 relative to the housing 60.

As shown, the support point P1, P2 of the support device 10 is offset relative to the rotation axis D, along the spacing axis A, in the direction of the engagement region 4. The support point P1, P2 may be level with the engagement region 4 along the spacing axis A. The support point P1, P2 is the central point of the points through which the support device 10 is supported in the direction of the rotation axis D. For example, with a circular support device with large area support, the center support point would lie in the middle of the circle area. If the support is provided by four points lying at the corners of the theoretical square, the center support point would be in the middle of the square. Where the support is symmetrical to a specific point, this point is the center support point. With non-symmetrical support, a large area central point may need to be determined. Although called a support point, often there are two support central points, one for a force acting in the direction of the rotation axis in one direction, and the other a force acting in the direction of the rotation axis in the opposite direction. In these cases, the statements above apply for each of the two support points.

To promote pivotability of the pivotable rotary bearing 7, and suppress the occurrence or propagation of noise, the support device 10 according to the exemplary embodiment is configured at least partially elastically; at least parts or portions of the support device 10 are elastic and allow a degree of mobility.

Preferably, the pivot axis K lies level with the support point P1, P2 along the spacing axis A, wherein the pivotable rotary bearing 7, and the worm gear shaft 2, do not pivot about an axis intersecting the rotation axis D, but one offset thereto. Due to the cooperation of the worm screw 2 and worm gear wheel 3, both an axial force component, parallel to the rotation axis D, and a radial force component, perpendicular to the rotation axis D, are exerted in the engagement region 4. The radial force component compensated by the pretension of the pretensioned loose rotary bearing 5. The total force relative to the pivot axis K leads to a torque, the direction of which depends on the direction of rotation. If the pivot axis K runs through the rotation axis D, the torque levels differ in amount, because the spacing of the action line of the respective force from the pivot axis K differs. If, however the pivot axis K is offset in the direction of the engagement region 4, and lies level with the engagement region 4 along the spacing axis A, the lever arms of the forces occurring in the engagement region 4 are equal resulting in torques of the same level. The radial force component is the same for both directions of rotation, meaning the vehicle behaves symmetrically on right-hand and left-hand corners, or in response to road surface factors such as cobblestones. In this way, it is also possible to avoid uneven loads and hence an uneven wear depending on the direction of rotation of the worm gear shaft 2.

Often, for production reasons, the support device 10 should be configured symmetrically. In the exemplary embodiment, an axis of symmetry S1, S2, S4 and/or a plane of symmetry S3 of at least a part of the support device 10 runs through the engagement region 4. This may be an axis of symmetry or a plane of symmetry of the entire support device 10, or just those parts of the support device influencing the position of the support points P1, P2. For example, the parts transmitting forces transversely to the rotation axis D, or connecting the support device 10 to the rotary bearing 7, may be disregarded in this context. With a symmetrical arrangement, the support point P1, P2 lies level with the engagement region 4 along the spacing axis A. The support device 10, symmetrical in itself, is offset eccentrically to the rotation axis D in the direction of the engagement region 4.

In one exemplary embodiment, the support device 10 includes a rubber-elastic ring 11, 12, 13. Such a rubber-elastic ring, produced from a corresponding elastomer, may be arranged between the pivotable rotary bearing 7 and the housing 60, wherein its central point does not however lie on the rotation axis D but is offset in the direction of the engagement region 4. The axis of symmetry of the ring which runs through its central point, may run through the engagement region 4.

The support device may include a rubber-elastic ring 11, 12 on both sides of the pivotable rotary bearing seven in the direction of the rotation axis D. These two rings 11, 12 may have the same dimensions and their central points or axes of symmetry are preferably arranged equally eccentrically relative to the rotation axis D. In this way, the support is the same irrespective of the direction of the force acting along the rotation axis D. Whereas the rings 11, 12 establish or at least co-define the axial stiffness, stiffness along the rotation axis, the stiffness in the radial direction may also be influenced if the support device 10 includes a rubber-elastic ring 13 transversely to the rotation axis, on the outside of the pivotable rotary bearing 7. Such an external ring only insignificantly influences the position of the support point P1, P2, and may therefore also be arranged coaxially to the rotation axis D. Grooves in the rotary bearing 7 correctly position the rubber-elastic rings 11, 12, 13. The grooves may be formed on sides of the rotary bearing 7, in an outer bearing ring of a ball bearing, and/or on sides of the housing 60. With the eccentrically arranged rings, the corresponding grooves must also be formed eccentrically to the rotation axis D.

In an alternative embodiment, the pivotable rotary bearing 7 may have a spherical outer contour offset eccentrically relative to the rotation axis D. The outer contour, forming part of a ball surface, is configured rotationally symmetrical relative to an axis of symmetry offset along the spacing axis A in the direction of the engagement region 4. Preferably, the axis of symmetry of the outer contour is identical to the axis of symmetry of the rings arranged on both sides of the pivotable rotary bearing in the direction of the rotation axis. The spherical, convex outer contour of the rotary bearing preferably corresponds to a spherical, concave inner contour of the housing.

In a further embodiment, the pivotable bearing 7 has an outer contour offset eccentrically relative to the rotation axis, wherein the support device 10 acts on the pivotable rotary bearing 7 in the region of the outer contour. In one embodiment, the pivotable rotary bearing is configured as a roller bearing, wherein an outer bearing ring thereof has an outer contour offset eccentrically relative to the rotation axis D, and the support device 10 acts on the outer bearing ring in the region of the outer contour. The inner contour of the outer bearing ring, more generally, of the pivotable rotary bearing, runs concentrically to the rotation axis D for reasons of true running, the outer contour is eccentrically offset promoting the eccentric shift of the support device 10. The latter acts on the bearing ring, or on the pivotable rotary bearing, in the region of the outer contour. The outer contour may here have a groove, a protrusion, a flange or similar which serves for interference fit with the support device 10. To prevent an undesirable loss of adjustment of the rotary bearing, this is preferably arranged rotationally fixedly relative to the housing.

In an additional embodiment, the support device 10 may include two annular spring elements 21, 22 arranged on either side of a flange 19.2 of the outer contour 19.1 of the pivotable rotary bearing 19 in the direction of the rotation axis D. The flange 19.2 extending in a plane transversely to the rotation axis D. The outer contour of the flange 19.1, may be formed differently, in particular it may be formed circular. With a roller bearing as outlined above, the flange 19.2 is formed on the outer bearing ring 19. The spring elements 21, 22 may be cup springs, Bellville washers, or wave washers, on both sides of the flange 19.2. Combinations are conceivable in which for example a cup spring, or another spring, is provided on one side of the flange 19.2 while a rubber-elastic ring is provided on the other side of the rotary bearing 19.

According to a further embodiment, the support device 30 includes an elastic clip, 31, 32 partially surrounding the pivotable rotary bearing 27. The clip 31, 32 made of sheet metal, wire, or other elastic material. To secure the position of the clip 31, 32 relative to the pivotable rotary bearing 27, an interference fit may be created directly or indirectly, via an intermediate element. In one example, the metal clip 31, 32 has inwardly directed protrusions formed by bending the wire or sheet metal. Preferably, the protrusions lie in a plane extending parallel to the rotation axis D and to the pivot axis and lying level with the engagement region 4 along the spacing axis A. It is also possible that the metal clip, in material-saving fashion, forms of a clasp and extends as a whole only in the plane. As illustrated in FIG. 4, the points P1, P2 at which the rotary bearing 27 is supported on the housing 60, by the metal clip 31, 32, also lie in the plane of the support point or points. The metal clip 31, 32 surrounds the pivotable rotary bearing 27 only partially. The metal clip 31, 32 may be made of one piece or be multipiece. In particular, it may have two identical halves placed against each other on assembly.

It is possible that the metal clip 31, 32, specifically the protrusions outlined above, engages grooves or depressions on the pivotable rotary bearing or the first outer bearing ring. In particular if a standard bearing is used, the pivotable rotary bearing 27 may be surrounded by a non-elastic encapsulation unit 33 on which the metal clip 31, 32 lies on the outside. The encapsulation unit 33 preferably surrounds the pivotable rotary bearing 27 at least partially by form fit, and may have a series of continuous or non-continuous recesses 33.1 on the outside thereof in which the metal clip 31, 32 may engage by form fit. The encapsulation unit 33 forms an adapter between a standard bearing and the metal clip 31, 32.

In another exemplary embodiment, the support device 40 includes a bearing holder supporting the pivotable rotary bearing 37 on the outside. The holder includes holding parts 41, 42, from which elastic connecting portions 41.3, 42.3 protrude for connecting the holder to the housing 60. The holder may include a sheet metal form fitting case receiving the pivotable rotary bearing 37. In the case of a roller bearing, each holding part 41, 42 engages the outer bearing ring 39. The connecting portions 41.3, 42.3 may be formed of sheet metal, integrally therewith. Preferably, the connecting portions 41.3, 42.3 form the only connection to the housing 60 and also define the support points P1, P2. They are arranged offset relative to the rotation axis D in the direction of the engagement region 4. The part of the holding arrangement creating the actual form fit with the rotary bearing, may like the bearing itself, be formed concentrically to the rotation axis D.

FIG. 6 illustrates the holder formed of a first and a second holding part 41, 42 adjoining each other in the region of the connecting portions 41.3 42.3. The connecting portions configured integrally with one of the two holding parts 41, 42, or a respective part of a connecting portion may be configured integrally with the first holding part and another part thereof may be configured integrally with the second holding part. The two holding parts 41, 42 may be connected together by an interference fit or by substance bonding. Each holding part 41, 42 may have a semicircular holding portion 41.1, 42.1 extending axially and running tangentially around the rotation axis D, on which radially inwardly directed flange portions 41.2, 42.2 are attached. The connecting portions 41.3, 42.3 may be sheet metal portions extending in one plane with the rotation axis D and the pivot axis K.

In one example, tapered portions 41.4 are formed in a region of the connecting portions 41.3, 42.3 facing the pivotable rotary bearing 37, wherein a notch 41.5 is formed in the axial direction A on at least one side of a tapered portion. This increases the elasticity about the pivot axis K. According to a further embodiment, stiffening webs 41.6 are formed in the region of the connecting portions 41.3, 42.3 facing the rotary bearing, the webs formed in the sheet metal or soldered or welded thereto. Such stiffening webs 41.6 may extend transversely to the rotation axis D. In this way, stiffness in the direction of the spacing axis A may be increased. The stiffness of the holding arrangement in the radial direction, transversely to the rotation axis D, may be increased if, according to a further preferred embodiment, an inwardly directed bead 41.7 is formed in the sheet metal in a portion of the holding arrangement arranged on the outside of the rotary bearing.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gear unit for a motor vehicle comprising:
a worm gear wheel;
a worm gear shaft rotatable about a rotation axis engaging said worm gear wheel in an engagement region spaced from the rotation axis along a spacing axis;
a pivotable rotary bearing supporting said worm gear shaft on a housing on one side of the engagement region and a rotary bearing, pretensioned in a direction of the spacing axis, supporting an opposite side of said worm gear shaft on said housing;
a support device supporting said pivotable rotary bearing on the housing in a direction of the rotation axis wherein the pivotable rotary bearing is pivotable relative to the housing about a pivot axis perpendicular to the rotation axis and to the spacing axis, the support device having a support point offset relative to the rotation axis along the spacing axis towards the engagement region;
a holder having a first holding part and a second holding part, both of the first and second holding parts engaging the pivotable rotary bearing, each of the first and second holding parts having flat connecting portions extending radially outward from the first and second holding parts, the flat connecting portions of the first holding part and the second holding part having an axis of symmetry, the axis of symmetry extending through the engagement region, each of the flat connecting portions extending in a plane parallel to both the pivot axis and the axis of symmetry, the flat connecting portions connecting said holder to the housing; and the first holding part and the second holding part contact each other only at the flat connecting portions.

2. A gear unit for a motor vehicle comprising:
a worm gear wheel;
a worm gear shaft rotatable about a rotation axis engaging said worm gear wheel in an engagement region spaced from the rotation axis along a spacing axis;
a pivotable rotary bearing supporting said worm gear shaft on a housing on one side of the engagement region and a rotary bearing, pretensioned in a direction of the spacing axis, supporting an opposite side of said worm gear shaft on said housing;
a support device supporting said pivotable rotary bearing on the housing in a direction of the rotation axis wherein the pivotable rotary bearing is pivotable relative to the housing about a pivot axis perpendicular to the rotation axis and to the spacing axis, the support device having a support point offset relative to the rotation axis along the spacing axis towards the engagement region;
the support device including a holder having a first holding part and a second holding part, each of the first and second holding parts having a semicircular holding portion including inwardly extending flange portions, the semicircular holding portion and inwardly extending flange portions directly contacting the pivotable rotary bearing, each of the first and second holding parts having a flat connecting portion extending radially outward from the first and second holding parts, the flat connecting portion of the first holding part and the flat connecting portion of the second holding part having an axis of symmetry, the axis of symmetry extending through the engagement region, each of the flat connecting portions extending in a plane parallel to both the pivot axis and the axis of symmetry, the flat connecting portions connecting said holder to the housing; and
a notch formed between the flat connecting portion of the first holding part and the semicircular holding portions of the first holding part and a notch formed between the flat connecting portion of the second holding part and the semicircular holding portion of the second holding part, each notch extending inward in an axial direction of the holder wherein said first and second holding parts contact each other only at the flat connecting portions.

3. A gear unit for a motor vehicle comprising:
a worm gear wheel;
a worm gear shaft, having a rotation axis, engaging said worm gear wheel in an engagement region spaced from the rotation axis;
a rotary bearing having an outer bearing ring;
a holder, said holder having a first holding part and a second holding part;
said first holding part including a holding portion having an arcuate shape, first and second ends, and flange portions extending radially inward toward the rotation axis;
said second holding part including a holding portion having an arcuate shape, first and second ends, and flange portions extending radially inward toward the rotation axis;
the outer bearing ring positioned between the flange portions of the first holding part and the flange portions of the second holding part and engaging the holding portions of each of the first and second holding parts;
each of the first and second holding parts having flat connecting portions extending radially outward from the respective first and second holding portions at the first and second ends thereof the flat connecting portion of the first holding part and the flat connecting portion of the second holding part having an axis of symmetry, the axis of symmetry extending through the engagement region, each of the flat connecting portions extending in a plane parallel to both a pivot axis and the axis of symmetry;
the flat connecting portions connecting said holder to a housing, said holder having a support point spaced from the rotation axis towards the engagement region; and
at least one of the flat connecting portions has a notch formed therein, the notch extending in an axial direction and forming a gap between the flange portions of the first holding portion and the flange portions of the second holding portion.

4. The gear unit of claim 3 wherein said first and second holding parts contact each other only at said first and second flat connecting portions.

5. The gear unit of claim 3 including a web extending between at least one of said holding portions and one of said flat connecting portions, the web extending transversely to the flat connecting portion and the rotation axis.

* * * * *